United States Patent [19]
Ando

[11] Patent Number: 4,763,987
[45] Date of Patent: Aug. 16, 1988

[54] LENS BARREL

[75] Inventor: Makoto Ando, Sakai, Japan

[73] Assignee: Minolta Camera Kabushiki Kaisha, Japan

[21] Appl. No.: 932,758

[22] Filed: Nov. 19, 1986

[30] Foreign Application Priority Data

Nov. 20, 1985 [JP] Japan ............................ 60-179728[U]
Mar. 8, 1986 [JP] Japan .............................. 61-33382[U]

[51] Int. Cl.$^4$ ................................................ G02B 7/04
[52] U.S. Cl. .................................................... 350/255
[58] Field of Search ......................... 350/255, 429–430; 354/195.1, 400

[56] References Cited

U.S. PATENT DOCUMENTS

| 3,834,796 | 9/1974 | Komine | 350/429 |
| 4,110,769 | 8/1978 | Schutz et al. | 350/429 |
| 4,413,894 | 11/1983 | Miki et al. | 354/195 |
| 4,456,356 | 6/1984 | Okabe | 354/195.13 |
| 4,553,817 | 11/1985 | Ando et al. | 350/255 |
| 4,676,600 | 6/1987 | Takizawa | 350/255 |

FOREIGN PATENT DOCUMENTS

| 117111 | 9/1980 | Japan . | |
| 187418 | 11/1982 | Japan . | |
| 7110 | 1/1983 | Japan . | |
| 180537 | 12/1983 | Japan . | |
| 77417 | 5/1984 | Japan | 354/195.1 |
| 68509 | 5/1985 | Japan . | |
| 82609 | 6/1985 | Japan . | |

Primary Examiner—William H. Punter
Attorney, Agent, or Firm—Wolder, Gross & Yavner

[57] ABSTRACT

A lens barrel has a lens barrel body, a movable lens unit accommodated in the lens barrel body and movable in a direction of an optical axis, a moving operational mechanism for moving the movable lens unit and a handling load change mechanism provided between the lens barrel body and the moving operational mechanism. The handling load change mechanism includes a moving operational member sliding contact portion and a lens barrel sliding contact portion which support handling loads through a fluid lubricant and a change operational member for changing the area of mutual contact by relative motion between the sliding portion.

11 Claims, 6 Drawing Sheets

LENS BARREL

BACKGROUND OF THE INVENTION

1. Field of the Invention

The present invention relates to a lens barrel of the type comprising a lens barrel body including an axially movable lens unit, operational means for moving the lens unit and a handling load change mechanism provided between the operational means and the lens barrel body.

2. Description of the Prior Art

According to prior-art lens barrels, focusing is carried out when a moving lens unit is shifted along the optical axis. In the case of the prior-art lens barrel also adapted for a zoom lens, the focal length of the lens is varied as the moving lens unit is shifted along the optical axis.

With the above-described lens barrels, when carrying out high angle or low angle photography, e.g. close-up photography under a condition in which the optical axis is considerably angularly displaced from the horizontal, it is desirable that resistance to movement or the handling load of the moving lens unit be relatively heavy in order to prevent unintentional movement of the moving lens unit caused by the weight of the lens unit per se. On the other hand, under the normal photographic condition in which the optical axis is substantially horizontal, it is desirable that the handling load be relatively light in order to facilitate a quick operation. Therefore, various constructions have been provided for changing the handling load in accordance with photographic conditions.

The handling load change mechanisms of the prior-art lens barrels are constructed as follows. An elastic member supported by a member provided between an operational control member and a lens barrel body is elastically adjustable to vary the frictional pressure between the elastic member and the lens barrel body, whereby the handling load is changed in accordance with the varied frictional pressure (for example as disclosed in the Japanese utility model application laid open under No. 60-68509).

According to the above construction, however, there occur problems to be described hereinafter.

The handling load is changed by the adjustment of the elastic member by an amount which is extremely small. Further, the adjustment is carried out in the spare space between a member of the operational control member and a member of the lens barrel body so that an assembly error in these members considerably affects the amount of the handling load change. Therefore, it is difficult to set a predetermined handling load at the time of assembly and there often occur differences in the handling load among lens barrels. Also, the range of changeable handling load is rather limited.

Moreover, since the handling load is changed by the transformation of the elastic member, the elastic member may incur creep after a long use. Also, since the elastic member is in contact with a member of the lens barrel body and the handling load change operation is carried out against the frictional force caused by the contact pressure, abrasion of the contact members may unintentionally provide a handling load different from the initially set value.

Also, some of the aforementioned prior-art lens barrels comprise automatic operational means for permitting a driving device to move the movable lens unit and power transmission interruption means for interrupting a power transmission from the driving device, thereby to enable an autofocusing operation.

These types of lens barrels are adapted to be switched between an autofocusing mode where the driving device moves the movable lens unit and a manual focusing mode where the movable lens unit is moved by manually operating a focusing ring and the like, whereby, in the manual focusing mode, by breaking the operative connection between the driving device and the movable lens unit a handling load on manual lens moving operational means may be minimized thereby to provide a smooth manual focusing operation and at the same time the driving device is not forcibly operated.

This type of lens barrel is known in which a driven member for transmitting a driving force of the driving device to the movable lens unit is adapted to be switched along the direction of the drive axis between an operatively-connected state and a disconnected state with the driving device (e.g. a Japanese utility model application laid open under No. 58-180537).

On the other hand, in the case of the lens barrels capable of providing autofocusing, it is desirable in terms of durability and power consumption of the driving device that the operational load on the driving device which is actually a motor should be light. To this end, there is a known lens barrel in which the operational load on the automatic lens moving operational means in the course of the lens moving operation by the driving device is lightened by providing a frictionless member such as a ball on a sliding contact portion of the automatic lens moving operational means (e.g. a Japanese utility model application laid open under No. 57-187418).

However, there is a problem to adopt the above construction to a lens barrel that can be manually operated.

That is to say, since the manual lens moving operational means and the automatic lens operational means partially both utilize the portion directly acting on the movable lens unit, the light operational load in the autofocuing mode necessarily results in a light handling load in the manual focusing mode. Moreover, if the operative connection with the driving device is broken in the manual focusing mode, the handling load becomes even lighter, whereby the movable lens unit is considerably moved even by a small force, whereby accurate focusing is difficult or the movable lens unit is unintentionally moved out of the focused condition.

SUMMARY OF THE INVENTION

Taking the above state of the art into consideration, it is an object of the present invention to provide a handling load change construction which is free from the adverse effects caused by assembly error and, further, through which the handling load change operation may be carried out over a wide range and also stably for a long period of time, and the handling load may be lightened in the automatic focusing operation.

According to the present invention there is provided a lens barrel comprising a lens barrel body, a lens unit located in the lens barrel body and movable along its optical axis, moving operational means for moving the movable lens unit and handling load change means provided between the moving operational means and the lens barrel body and including a first sliding contact portion and a second sliding contact portion in sliding contact with each other through a fluid lubricant and further including change operational means for changing the area of the sliding contact by relatively moving the sliding contact portions.

Further according to the invention, there is provided a lens barrel comprising a lens barrel body, a lens unit located in the lens barrel body and movable along the optical axis, manual lens moving operational means for manually moving the movable lens unit, a driving device for automatically moving the movable lens unit, automatic lens moving operational means for permitting the driving device to move the movable lens unit, power transmission interruption means for interrupting the power transmission between the movable lens unit and the driving device and handling load change means for changing the handling load of the manual lens moving operational means with the power transmission interrupted to be heavier than the handling load of the automatic lens moving operational means with the power transmission connected.

Functions of the handling load change means will be particularly described next.

When two solid objects are in contact with each other, a frictional force acting as the handling load between the objects is in direct proportion to the frictional pressure therebetween. Whereas, in case there is provided a fluid therebetween, the handling load between the objects is affected by the viscosity of the fluid and is in direct proportion to the frictional area between the objects through the fluid. Thus, utlizing this principle, if the sliding portion of the moving operational means and the sliding portion of the lens barrel body are in a sliding contact with each other through the fluid, it is possible to change the handling load between the moving operational means and the lens barrel body without causing the solid objects to come into direct contact with each other by a relative movement of the sliding portions.

Furthermore, in a lens barrel capable of an autofocusing operation, the present invention provides the following characterizing feature.

Since in the manual focusing mode the movable lens unit is manually moved by breaking the operative connection with the driving device and the driving device is not forcibly operated therewith, the driving device is protected from erroneous operation. Also, in the above condition, the handling load on the manual lens moving operational means is changed to be greater than the operational load in the automatic focusing mode. Therefore, even if the handling load on the automatic lens moving operational means is set to be extremely light in order to lighten the operational load on the driving device, it is possible to provide a handling load suitable for the manual operation of the manual lens moving operational means in the manual focusing mode.

BRIEF DESCRIPTION OF THE DRAWINGS

The accompanying drawings illustrate embodiments of a lens barrel according to the present invention, in which.

DESCRIPTION OF THE PREFERRED EMBODIMENTS

Figure 1:
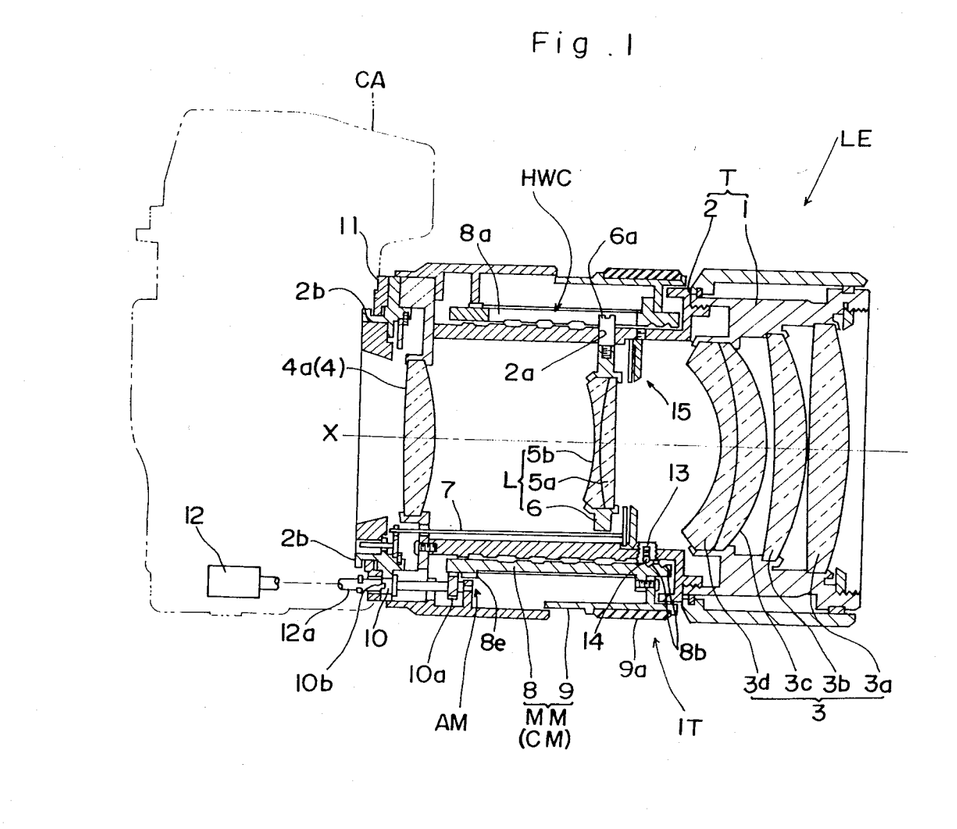
FIG. 1 is a vertical longitudinal sectional view of an embodiment of the lens barrel of the present invention in a state of a heavy handling load.
Figure 2:
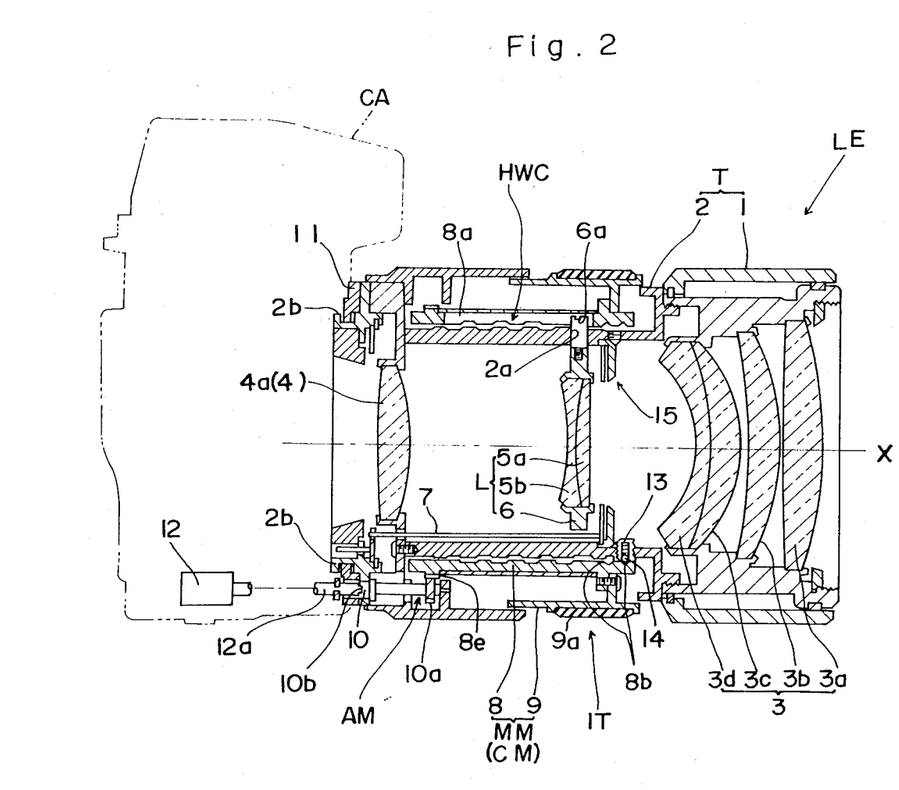
FIG. 2 is a view similar to FIG. 1 but with the lens barrel in a state of a light handling load.

FIGS. 1 and 2 are longitudinal sections of a lens barrel LE according to the present invention.

A lens barrel body T includes a front lens barrel 1 and a rear lens barrel 2 which are fixedly screwed to each other. The front lens barrel 1 fixedly mounts a front lens assembly 3 including four lenses 3a through 3d. The rear lens barrel 2 mounts at a rear portion thereof a rear lens assembly 4 including a lens 4a. The rear lens barrel 2 supports therein a movable lens unit L adapted to move along the longitudinal or optical axis X and disposed between the front lens assembly 3 and the rear lens assembly 4.

The movable lens unit L includes two lenses 5a and 5b, a lens holder 6 supporting these lenses 5a, 5b and so on. The lens holder 6 has three guide pins 6a fixedly screwed to the outer peripheral edge thereof. The guide pins 6a respectively extend through three cam grooves or slots 2a each having a lead formed in the peripheral face of the rear lens barrel 2 and engage three straight slots or grooves 8a extending parallel to the optical axis X in a peripheral face of a straight groove ring 8 externally engaging and coaxial with the rear lens barrel 2.

The straight groove ring 8 radially outwardly carries an operational ring 9 carrying a rubber collar or ring 9a on the outer periphery thereof and fixedly screwed to the straight groove ring 8 to be rotatable in unison therewith. By manually rotating the operational ring 9, the guide pins 6a, whose peripheral movement relative to the straight groove ring 8 is prevented by the straight groove 8a, are guided by the cam grooves 2a of the rear lens barrel 2 and at the same time the movable lens unit L is shifted along the optical axis X while rotating about the optical axis X, whereby a focusing operation is carried out. That is to say, the straight groove ring 8 and the operational ring 9 which are operated in mutual unison constitute a manual lens moving operational mechanism MM for the movable lens unit L.

At a rear end of the outer peripheral face of the straight groove ring 8, there is provided a gear portion 8e engagable with a coupler gear 10a associated with an AF coupler 10. The straight groove ring 8 is slidable along the optical axis X. More particularly, the gear portion 8e, as shown in FIG. 2, comes into engagement with the coupler gear 10a when the straight groove ring 8 is in the rear end position in the direction of the optical axis X and comes out of the engagement with the coupler gear 10a when the ring 8 is in a forward or front end position along the optical axis X, as shown in FIG. 1.

The AF coupler 10 is supported by the rear lens barrel 2 to be freely rotatable relative thereto, an engaging portion 10b formed in a rear edge thereof facing outside the rear lens barrel 2 at the rear edge of the rear lens barrel 2. Barrel 2 includes at the rear edge thereof bayonet pawls 2b engagable with a lens mount 11 of a camera body CA. When the lens is mounted to the camera body CA as the pawls 2b are engaged with the lens mount 11, the engaging portion 10b of the AF coupler 10 is operatively connected to a lens drive shaft 12a operatively connected to a lens drive motor 12 of the camera body CA.

More particularly, when the operational ring 9 is rearwardly positioned along the optical axis X as shown in FIG. 2, the gear portion 8e of the straight groove ring 8 engages the coupler gear 10a of the AF coupler 10 and the movable lens unit L is automatically shifted along the optical axis X as driven by the lens drive motor 12, by way of example, of a driving device housed in the camera body CA. On the other hand, when the operational ring 9 is forwardly positioned along the optical axis X as shown in FIG. 1, the shifting of the movable lens unit L along the optical axis X is carried out by manually operating the operational ring 9.

That is to say, the straight groove ring 8 and the AF coupler 10 constitute an automatic lens moving operational mechanism AM for the movable lens unit L. Further, the mechanism for disengaging the coupler gear 10a and the gear portion 8e by longitudinally moving the straight groove ring 8 constitute a power transmission interruption mechanism IT.

Further, when the operational ring 9 is forwardly or rearwardly positioned, the optical axis X and a click ball 14 biased and outwardly supported by a spring 13 in the outer peripheral face of the rear lens barrel 2 comes into engagement with one of the engaging grooves 8b formed in the inner peripheral face of the straight groove ring 8, the operational ring 9 is maintained at a certain position along the optical axis X.

Moreover, there are provided a diaphragm 15 fixedly supported by the rear lens barrel 2 and an operational member 7 for the diaphragm 15.

Furthermore, it is possible to change the handling load for rotating the straight groove ring 8 for directly moving the movable lens unit L by changing over the driving state of the movable lens unit L by forwardly and backwardly moving the operational ring 9 along the optical axis X, i.e. in response to the power transmission interruption operation by the power transmission interruption mechanism IT between the movable lens unit L and the lens drive motor 12.

That is to say, in case the movable lens unit L is automatically shifted by the driving of the lens drive motor 12 of the camera body CA, it is desirable that the straight groove ring 8 is lightly rotatable in order to lighten the driving load on the motor 12; whereas, in case the movable lens unit L is moved by the manual operation of the operational ring 9, it is desirable that the straight groove ring 8 has a relatively heavy rotational load because accurate focusing is difficult if the operational ring 9 has too light a load.

For this purpose, a handling load change mechanism HWC is provided between the rear lens barrel 2 and the straight groove ring 8. This handling load change mechanism HWC is hereinafter particularly described with reference to FIGS. 1 through 3.

Figure 3:
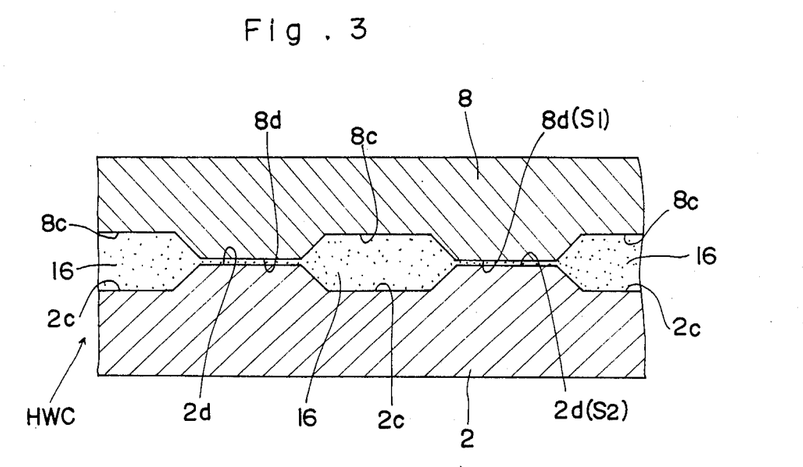
FIG. 3 is a partially enlarged sectional view of a handling load change mechanism.

Referring to FIG. 3, the rear lens barrel 2 has formed in and along the outer peripheral face thereof a plurality of annular grooves 2c. On the other hand, the straight groove ring 8 also formed in and along the inner peripheral face thereof a plurality of annular grooves 8c. The space between the outer peripheral face of the rear lens barrel 2 and the inner peripheral face of the straight groove ring 8 is filled with grease 16. As the operational ring 9 is moved forward and backward to change the sliding contact area between the outer peripheral face of the rear lens barrel 2 and the inner peripheral face of the straight groove ring 8, it is possible to change the handling load.

When the operational ring 9 is positioned forwardly along the optical axis X, as shown in FIGS. 1 and 3, an annular convex ridge or portion 2d formed between the adjacently disposed annular grooves 2c in the outer peripheral face of the rear lens barrel 2 is in a sliding contact with an annular concave ridge or portion 8d formed between the adjacently disposed annular grooves 8c in the inner peripheral face of the straight groove ring 8 forming an extremely small space therebetween. Therefore, in this condition, the area of sliding contact between the outer peripheral face of the rear lens barrel 2 and the inner peripheral face of the straight groove ring 8 is relatively large.

On the other hand, when the operational ring 9 is positioned rearwardly along the optical axis X, as shown in FIG. 2, the annular grooves 2c and the angular convex portions 2d in the outer peripheral face of the rears lens barrel are respectively in engagement with the annular convex portions 8d and the annular grooves 8c defined in the inner peripheral face of the straight groove ring 8, forming a relatively large space therebetween. Therefore, in this condition, there is almost no sliding contact area between the outer peripheral face of the rear lens barrel 2 and the inner peripheral face of the straight groove ring 8 and the rear lens barrel 2 and the straight groove ring 8 only support each other, being in sliding contact only at the both ends of the straight groove ring 8.

When the two members are in sliding contact with each other through a fluid such as the grease 16 by way of example of fluid lubricants, a force acting on the members in the direction of the face of the sliding contact is in direct proportion to the area of the sliding contact. More particularly, when the sliding contact area between the outer peripheral face of the rear lens barrel 2 and the inner peripheral face of the straight groove ring 8 is relatively large, as shown in FIGS. 1 and 3, the handling load of the movable lens unit L is heavy. On the other hand, when the sliding contact area between the outer peripheral face of the rear lens barrel 2 and the inner peripheral face of the straight groove ring 8 is small, as shown in FIG. 2, the handling load of the movable lens unit L is light.

Accordingly, when the movable lens unit L is moved by the manual operation of the operational ring 9, the handling load is relatively large and accurate focusing is possible. Also, when the movable lens unit L is automatically moved by the driving of the lens drive motor 12 of the camera body CA, the handling load is relatively light and so is the rotational load on the motor 12.

As described above, the handling load change mechanism HWC comprises the annular convex portion 8d on the inner peripheral face of the straight groove ring 8 as an example of a moving operational member sliding contact portion S1, the annular convex portion 2d on the outer peripheral face of the rear lens barrel 2 as an example of a lens barrel sliding contact portion S2, the straight groove ring 8 acting as a moving operational member MM for the movable lens unit L and a change operation member CM acting also as the operational ring 9.

According to the construction described in the previous embodiment, the lens unit L is moved along the optical axis X with the peripheral rotation thereof by the manual operation of the operational ring 9 and the automatic operation of the lens drive motor 12. However, with this construction, if the diaphragm 15 along with the lenses 5a and 5b is fixed to the lens holder 6, i.e. the diaphragm 15 is adapted to be moved along the optical axis X in unison with the movable lens unit L because of a characteristic requirement of the lens and the like, there sometimes occurs a problem to be described hereinafter.

In recent years, an automatic stop-down mechanism is employed in most photographic cameras. This automatic stop-down mechanism is operated to obtain a predetermined aperture value from the camera body side at the time of photography. For this reason, as described in the previous embodiment, a coupling operational member 7 must be provided between the diaphragm 15 and the camera body CA. It is not desirable for the diaphragm 15 to move with the peripheral rotation since this results in a complicated operational construction including the coupling operational member 7. Another embodiment having a construction which is useful in this case, will be described next.

Figure 4:
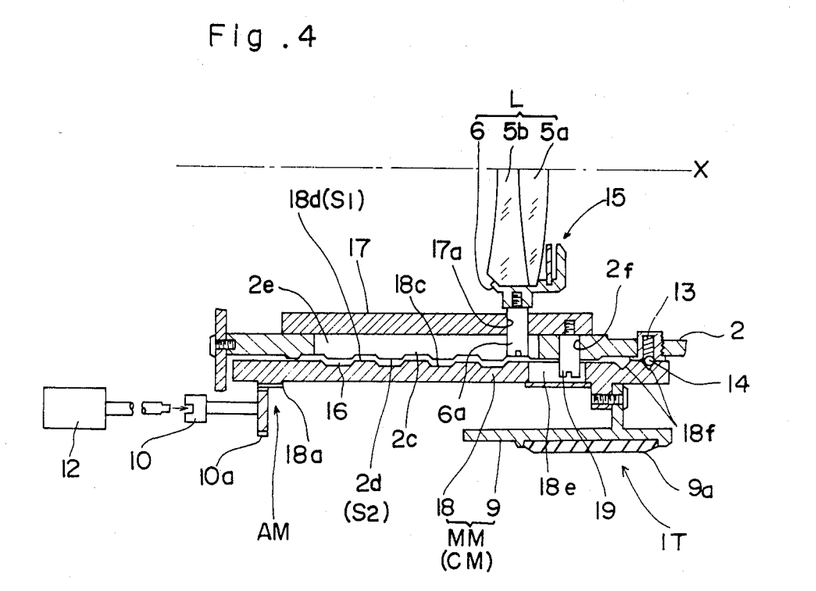
FIG. 4 is a vertical longitudinal sectional view showing a part of a lens barrel of another embodiment corresponding to FIG. 2.

FIG. 4 shows a partial section of a lens barrel according to this embodiment. In the following description, it is to be noted, the same components as those in the previous embodiment are denoted by the same reference numerals and will not be particularly described unless necessary.

A cylindrical member 18 corresponding to the straight groove ring 8 in the previous embodiment and outwardly engaging the rear lens barrel to be rotated in unison with the operational ring 9, does not possess the straight grooves. Instead, the rear lens barrel 2 has three straight grooves 2e parallel to the optical axis X. Also, there is provided a cam ring 17 having three cam grooves 17a having a lead and inwardly engaging the rear lens barrel 2.

The three guide pins 6a fixed to the lens holder 6 of the movable lens unit L extend respectively through the cam grooves 17a and engage the straight grooves 2e of the rear lens barrel 2. A coupler pin 19 extends through an annular slot or groove 2f formed in the peripheral wall of the rear lens barrel 2 and engages a handling load switching guide groove 18e formed in the peripheral face of the cylindrical member 18 parallel to the optical axis X.

The movable lens unit L is moved along the optical axis X in the same manner as in the previous embodiment, thereby to carry out the focusing operation. This moving operation of the movable lens unit L is carried out, also in the same manner as the previous embodiment, by the manual operation of the operational ring 9 or by the automatic operation of the lens drive motor 12 of the camera body CA through the AF coupler 10.

When the cylindrical member 18 is rotated by either the manual or automatic operation, the cam ring 17 is rotated in unison therewith. Since the rotation of the movable lens unit L about the optical axis X is prevented by the straight groove 2e of the rear lens barrel 2, the guide pin 6a of the movable lens unit L proceeds along the straight groove 2e as driven by the cam groove 17a of the cam ring 17, whereby the movable lens unit L is moved forwardly or rearwardly along the optical axis X thereby to carry out the focusing operation.

In this embodiment also, like in the previous embodiment, it is possible to change the handling load in moving the movable lens unit L. More particularly, the annular convex portions 2d formed between the annular grooves 2c peripherally formed in the outer peripheral face of the rear lens barrel 2 function as the lens barrel sliding contact portion S2, whereas the annular convex portions 18d formed between the annular grooves 18c in the inner peripheral face of the cylindrical member 18 function as the operational member sliding contact portion S1. By changing the sliding contact area between the sliding portions S1 and S2 which are in sliding contact with each other through grease 16, it is possible to change the handling load.

For changing the sliding contact area in the same manner as in the previous embodiment, the operational ring 9 rotatable in unison with the cylindrical member 18 is axially moved. In this case, however, since the cylindrical member 18 is adapted to move along the handling load switching guide groove 18e, the coupler pin 19 fixed to the cam ring 17 is not moved. When the operational ring 9 is positioned forwardly along the optical axis X, the handling load is heavy. On the other hand, when the operational ring 9 is positioned rearwardly along the optical axis X, the handling load is light.

As described above, in this embodiment, the handling load change mechanism HWC comprises the sliding contact portions S1 and S2, a change operational member CM acting also as the moving operational member HM including the operational ring 9 and the cylindrical member 18.

Further, the gear portion 18a located on the outer periphery of the cylindrical member 18 at the rear end thereof comes into engagement with the coupler gear 10a of the AF coupler 10 only when the operational ring 9 is positioned rearwardly along the optical axis X. It is to be noted that FIG. 4 shows the condition in which the operational ring 9 is positioned rearwardly along the optical axis X and the handling load is light. There are provided engaging grooves 18f for receiving the click ball 14 supported by the rear lens barrel 2.

In both the two embodiments described hereinbefore, the operational ring 9 is rotated in moving the movable lens unit L along the optical axis X by the manual operation of the operational ring 9. This construction may be used for the focusing operation in the previous embodiments and also for a focal length change operation of a zoom lens. In some zoom lenses, in order to move the movable lens unit L along the optical axis X for zooming, the operational ring 9, per se, is also moved in the same direction. To such systems, the present invention may also be applied, as in the following embodiment described with reference to FIGS. 5, 6a and 6b.

Figure 5:
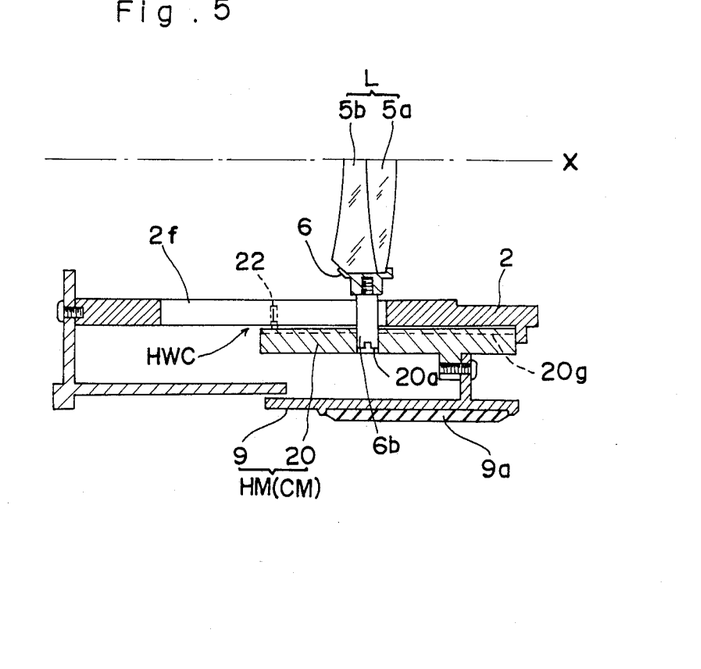
FIG. 5 is a vertical longitudinal sectional view showing a part of the lens barrel of another embodiment corresponding to FIG. 2.

FIG. 5 shows a partial section of a lens barrel for a zoom lens. It is to be noted that in this embodiment the same components as those in the previous embodiment are denoted by the same reference numerals.

In this embodiment, the rear lens barrel 2 has a straight longitudinal groove 2f on the peripheral face thereof along the direction of the optical axis X. The guide pin 6b fixed to the lens holder 6 of the movable lens unit L extends through the straight groove 2f and fixedly engages an engaging bore 20a in the cylindrical member 20 engaging the outside face of the rear lens barrel 2. The cylindrical member 20 fixedly carries the operational ring 9, whereby a zooming operation is carried out as the movable lens unit L is moved forwardly and rearwardly along the optical axis X by moving the operational ring 9 forwardly and rearwardly along the optical axis X.

Figure 6A:
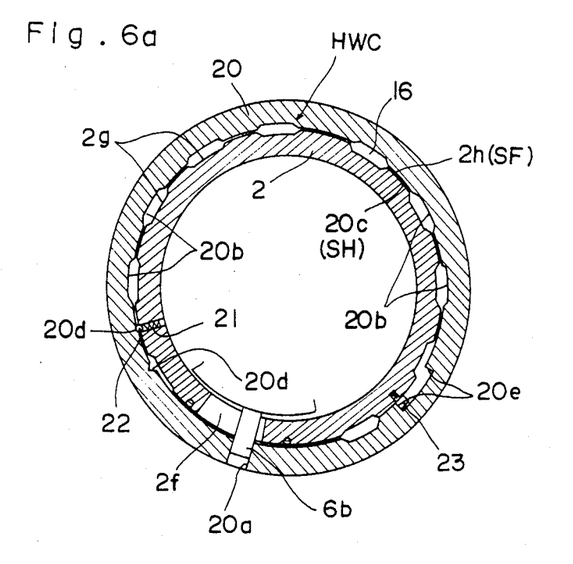
FIG. 6a is a transverse cross sectional view of the lens barrel of another embodiment in a state of a heavy handling load.
Figure 6B:
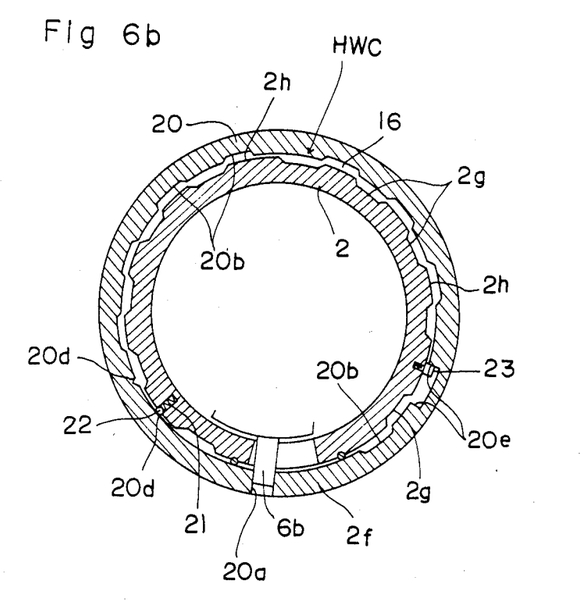
FIG. 6b is a transverse cross sectional view of the lens barrel of another embodiment in a state of a light handling load.

Referring to FIGS. 6a and 6b, the rear lens barrel 2 has in the outer peripheral face at a rear portion thereof a plurality of straight grooves 2g parallel to the optical axis X; whereas, the cylindrical member 20 has in the inner peripheral face a plurality of longitudinal straight grooves 20b. Also, the space between the outer peripheral face of the rear lens barrel 2 and the inner peripheral face of the cylindrical member 20 is filled with the grease 16. By rotating the operational ring 9, the handling load when carrying out the zooming operation by the movement of the lens unit L along the optical axis X may be varied.

More particularly, when the operational ring 9 is rotated counterclockwise as viewed in FIG. 6a, straight convex ridge portions 2h formed between the adjacently disposed straight grooves 2g in the outer peripheral face of the rear lens barrel 2 come into a sliding contact with the straight convex portions 20c formed between the adjacently disposed straight grooves 20b in the inner peripheral face of the cylindrical member 20, thereby to create a large sliding contact area. Therefore, in this condition, the handling load of the movable lens unit L is heavy. In contrast, when the operational ring 9 is rotated clockwise as shown in FIG. 6b, the sliding contact area is small and the handling load is light.

That is to say, in this embodiment, the straight convex portions 2h in the outer peripheral face of the rear lens barrel 2 function as the lens barrel sliding contact portion SF, and the straight convex portions 20c on the inner peripheral face of the cylindrical member 20 function as the operational member sliding contact portion SH. Further, the moving operational member HM including the operational ring 9 and the cylindrical member 20 acts also as the change operational member CM. And, these sliding contact portions SF and SH the change operational member CM constitute the handling load change mechanism HWC.

It is to be noted that the stright groove 2f in the rear lens barrel 2 has a large width in the peripheral direction of the rear lens barrel 2 and that the guide pin 6b fixed to the movable lens unit L and engaging the bore 20a of the cylindrical member 20 is moved peripherally inside the straight groove 2f in accordance with the handling load change operation.

Also, when the operational ring 9 is rotated counterclockwise as shown in FIG. 6a or clockwise as shown in FIG. 6b, a click ball 22 outwardly urged and supported through a spring 21 by the outer peripheral face of the rear lens barrel 2 comes into engagement with either of the pair of longitudinal engaging grooves 20d in the inner peripheral face of the cylindrical member 20 so that the operational ring 9 is maintained at the selected peripheral position. These engaging grooves 20d are also utilized for guiding the movement of the movable lens unit L along the optical axis X. Reference numeral 23 denotes a positioning pin for limiting the rotational range of the cylindrical member 20 by coming into contact with stop portion 20e of the cylindrical member 20.

Figure 7:
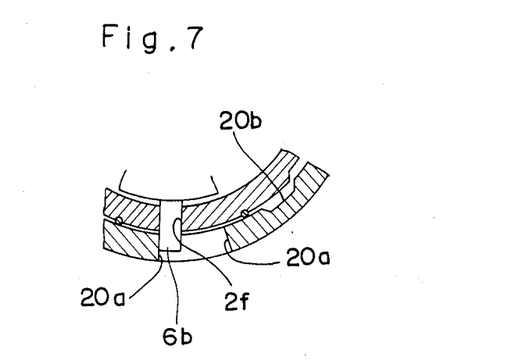
FIG. 7 is a cross sectional view showing a part of a lens barrel of still another embodiment.

In a case such as the above embodiment wherein the movable lens unit L is longitudinally moved by similarly longitudinally moving the moving operational member HM if it is desired that the movable lens unit L not be rotated in the course of the handling load change operation because of the aforementioned characteristic requirement of the lens and the like, the construction shown in FIGS. 5, 6A and 6B is partially changed, in which the engaging bore 20a of the cylindrical member 20 has a larger peripheral width and at the same time the straight groove 2f of the rear lens barrel 2 has a width as large as the exterior radius of the guide pin 6b, as shown in FIG. 7.

Moreover, though not shown, when the zoom lens is employed as in this embodiment, it is also possible to adapt the motor for moving the movable lens unit L to be switched between the connected state connected with the movable lens unit L and a disconnected state thereby to change the handling load in accordance with this switching operation.

In any of the above-described embodiments, when the movable lens unit L is automatically shifted along the optical axis X by means of the lens drive motor 12, the operational ring 9 is rotated in unison with the straight groove ring 8 or with the cylindrical member 18. In place of this, the operative connection between the operational ring 9 and the straight groove ring 8 may be interrupted in order to lighten the load on the lens drive motor 12. Another embodiment using this construction will be described next.

Figure 8:
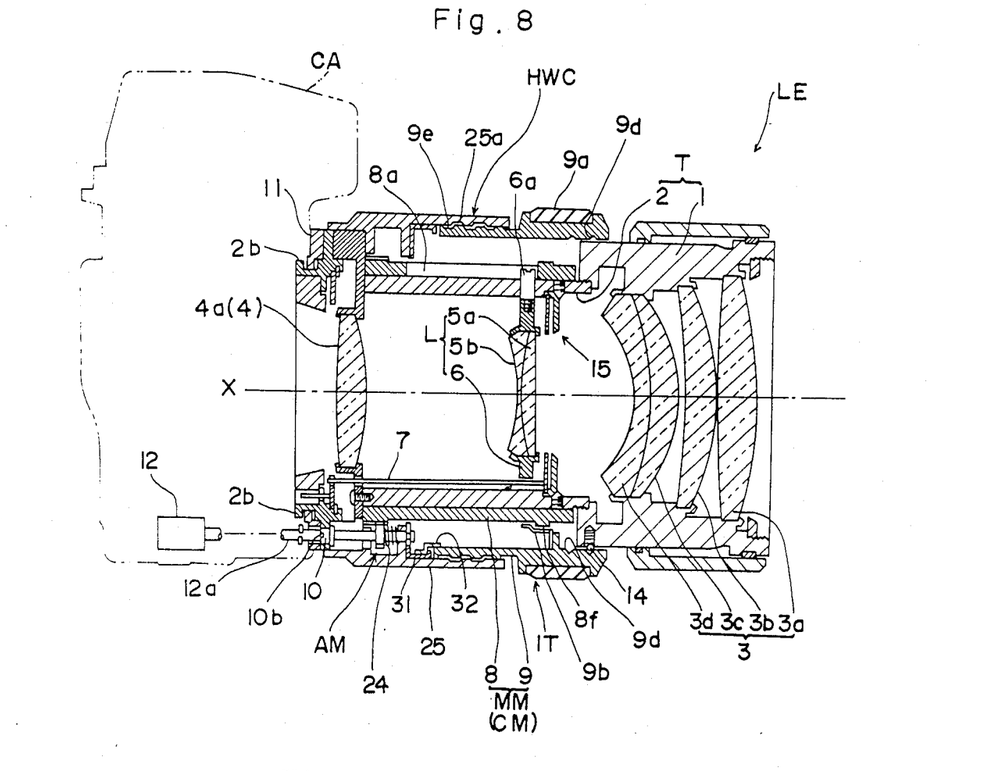
FIG. 8 is a vertical longitudinal sectional view of the lens barrel of still another embodiment corresponding to FIG. 2.
Figure 9:
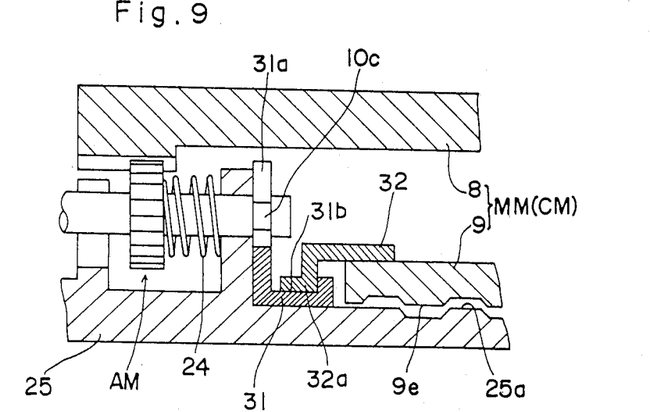
FIG. 9 is a fragmentary enlarged view of the lens barrel of the embodiment shown in FIG. 8.

FIGS. 8 and 9 are longitudinal cross sections of the lens barrel of this embodiment. It is to be noted that the same components as those employed in the embodiment shown in FIGS. 1 and 2 will be denoted by the same reference numerals and will not be described unless necessary.

In this embodiment, the straight groove ring 8 is not movable along the optical axis X but is only rotatable; whereas, the operational ring 9 is movable along the optical axis X. The operational ring 9 and the straight groove ring 8 are not fixedly screwed to each other; instead, a protruding member 9b is fixed to the operational ring 9 and an engaging projecting portion 8f is provided on the straight groove ring 8 and engages the protruding member 9b with the movement of the operational ring 9 along the optical axis X.

Further, the AF coupler 10 is urged by a spring 24 leftwardly and is carried by a fixed ring 25 fixed to the rear lens barrel 2. A fork ring 31 having an elongated bore 31a engaging a portion 10c of the AF coupler 10 is carried by the fixed ring 25 to be movable only along the optical axis X. The portion 10c having a smaller radius than that of the AF coupler 10 is connected through the elongated bore 31a to be rotatable.

A key plate 32 is in loose connection with a peripheral groove 31b of the fork ring 31. This key plate 32 is moved in unison with a rightward movement of the operational ring 9, whereby the fork ring 31 is pulled rightwardly to forcibly move the AF coupler 10 rightwardly against the urging force of a spring 24 thereby to release the connection between the lens drive shaft 12a and the AF coupler.

The operational ring 9 has a pair of engaging grooves 9d and the click ball 14 selectively engaging a groove 9d to maintain the operational ring 9 at a certain position along the optical axis X is provided on the peripheral face of the front lens barrel 1.

Moreover, in this embodiment, the handling load change mechanism HWC is disposed between the operational ring 9 and the fixed ring 25. That is to say, the annular convex portions 9e in the outer peripheral face of the operational ring 9 and annular convex portions 25a in the inner peripheral face of the fixed ring 25 function as the pair of sliding contact portions S1 and S2, and the operational ring 9 functions as the change operational member CM for changing the area of the sliding contact between the sliding contact portions S1 and S2.

In FIG. 8, the operational ring 9 is positioned rearwardly along the optical axis X. In this condition, the AF coupler 10 is urged by the spring 24 leftwardly and the engaging portion 10b thereof is in engagement with the lens drive shaft 12a, thereby to enable the automatic focusing operation by the lens drive motor 12. Further, in this condition, the protruding member 9b of the operational ring 9 is not in engagement with the engaging convex portion 8f of the straight groove ring 8 and the sliding contact area between the pair of sliding contact portions S1 and S2 constituting the handling load change mechanism HWC is small thereby to provide a light handling load.

If the operational ring 9 is shifted rightwardly in this condition, the operative connection between the AF coupler 10 and the lens drive shaft 12a is released and at the same time protruding member 9b of the operational ring 9 comes into engagement with the engaging convex portion 8f of the straight groove ring 8, thereby to enable the manual focusing operation by the operational ring 9. At this time, the sliding contact area between the sliding contact portions S1 and S2 is large to provide a heavy handling load.

In any of the embodiments described hereinbefore, the handling load change mechanism HWC is adapted to change and maintain the handling load in two stages. Instead of this, it is also possible to adapt the mechanism HWC to change and maintain the handling load in more than three stages by increasing the number of the engaging grooves 8b, 9d, 18f and 20d to more than three. Further, in place of the aforementioned construction wherein the handling load is maintained by the engagement between the click ball 14 or 22 and the engaging groove 8b, 9d, 18f or 20d, it is possible to eliminate the engaging groove 8b, 9d, 18f or 20d and to provide a frictional force alone, which is caused by the urging force of the spring 13 or 21 between the click ball 14 (22) and the straight groove ring 8 or the cylindrical member 18 (20), to maintain the handling load thereby to permit the continuous change of the handling load. Needless to say, in the aforementioned embodiments also, it is possible to adapt a different portion other than the engaging portion between the click ball 14 (22) and the engaging groove 8b (20d) to continuously change and maintain the handling load.

Furthermore, the number and kinds of the lenses constituting the movable lens unit L or the construction for moving the movable lens unit L may be conveniently changed. For instance, when the focusing operation is automatically carried out, a motor for driving the movable lens unit L may be provided inside the lens barrel in place of the construction described in the previous embodiments wherein the lens drive motor 12 is incorporated in the camera body CA. Also, in any of the aforementioned embodiments, the moving operational member HM for moving the movable lens unit L along the optical axis X acts also as the change operational member CM for changing the handling load. Instead of this, though not shown, it is possible to provide the change operational member CM independently of the moving operational member HM to change the handling load.

I claim:

1. A lens barrel, comprising:
   a lens barrel body;
   a lens unit movable in said lens barrel body along an optical axis;
   moving operational means for moving said lens unit; and
   handling load change means provided between said moving operational means and said lens barrel body; including,
   a first sliding contact portion and a second sliding contact portion being in a sliding contact with each other through a fluid lubricant, and
   change operational means for changing the area of the sliding contact by relatively moving said sliding contact portions.

2. A lens barrel, as defined in claim 1, wherein said first sliding contact portion is on said moving operational means and said second sliding contact portion is on said lens barrel body.

3. A lens barrel, as defined in claim 2, wherein said change operational means and said moving operational means are constituted as a single operational member and said operational member is adapted for changing the sliding contact area of said sliding contact portions when operated in a direction different from the operational direction for said movable lens unit.

4. A lens barrel, comprising:
   a lens barrel body;
   a lens unit movable in said lens barrel body along an optical axis;
   manual lens moving operational means for manually moving said lens unit;
   a driving device for automatically moving said lens unit;
   automatic lens moving operational means for enabling said driving device to move said movable lens unit;
   power transmission interruption means for interrupting the drive transmission between said lens unit and said driving device; and
   handling load change means for changing the handling load of said manual lens moving operational means with the power transmission interrupted to be heavier than the handling load of said automatic lens moving operational means with the power transmission connected, said handling load change means comprising first and second sliding contact portions in sliding contact with each other through a fluid lubricant and change operational means for changing the area of the sliding contact between said first and second sliding contact portions by relatively moving said first and second sliding contact portions.

5. A lens barrel, comprising:
   a lens barrel body;
   a lens unit movable in said lens barrel body and along an optical axis;
   manual lens moving operational means for manually moving said lens unit;

a moving device for automatically driving said lens unit;

automatic lens moving operational means for enabling said driving device to move said movable lens unit;

handling load change means for changing a handling load of said manual lens moving operational means to be heavier than a handling load of said automatic lens moving operational means; and change operational means for enabling said handling load change means to selectively provide a heavy handling load and a light handling load.

6. In an adjustable lens assembly, a pair of coaxial inner and outer sleeves axially relatively movable and rotatably relatively movable in respective modes, a lens element axially movable in response to the relative movement of said sleeves in a first of said modes, said sleeves having confronting faces with spaced mutually slidably engagable bearing surfaces and means for relatively moving said sleeves in the second of said modes to vary the area of engagement between said bearing surfaces whereby to vary the resistance to the relative movement of said sleeves in said first mode.

7. The lens assembly of claim 6 including a fluid lubricant disposed between the mutually slidably engaged bearing surfaces.

8. The lens assembly of claim 7 wherein said bearing surfaces extend peripherally about said sleeve confronting faces and are longitudinally spaced by annular recesses in said confronting faces between longitudinally successive bearing surfaces, said first mode being the relative rotation of said sleeves and said second mode being the relative longitudinal movement of said sleeves.

9. The lens assembly of claim 7 wherein said bearing surfaces extend longitudinally along said sleeve confronting faces and successive bearing sufaces on each of said sleeve confronting faces are separated by longitudinal recesses, said second mode being the relative longitudinal movement of said sleeves and said first mode being the relative rotation of said sleeves.

10. The lens assembly of claim 6 comprising a barrel member, one of said sleeves being immovable relative thereto.

11. In an adjustable lens assembly, a lens barrel, a lens unit axially movable in said lens barrel, motor driven means for moving said lens unit, manual means for manually moving said lens unit, means for alternatively drive coupling and uncoupling said motor drive means to said lens unit and means for alternatively setting the resistance to movement of said lens unit in a low resistance and high resistance condition in response to the drive coupled and drive uncoupled condition respectively of said motor driven means, said alternative setting means including first and second sliding contact portions in sliding contact with each other through a fluid lubricant and change operational means for changing the area of the sliding contact between said first and second sliding contact portions by relatively moving said first and second sliding contact portions.

* * * * *